April 29, 1969 W. D. GORDON ET AL 3,441,893
RESISTANCE TEMPERATURE DETECTOR
Filed Dec. 28, 1966
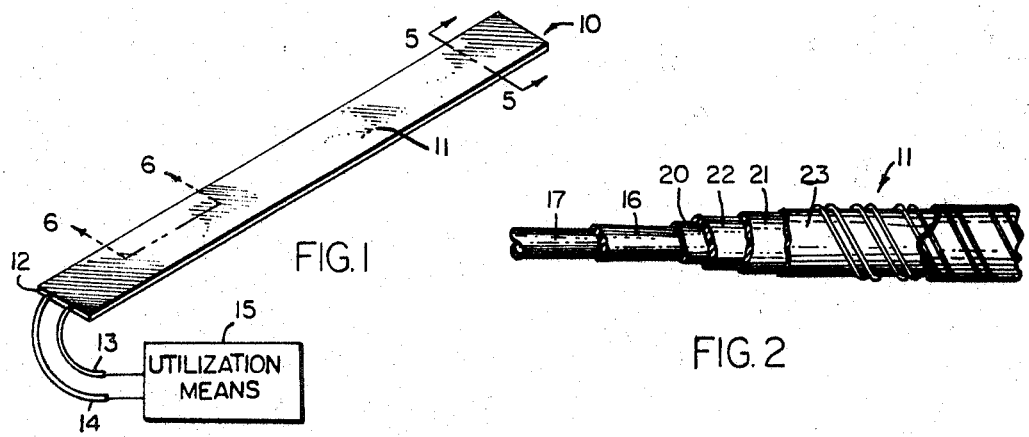
FIG.1
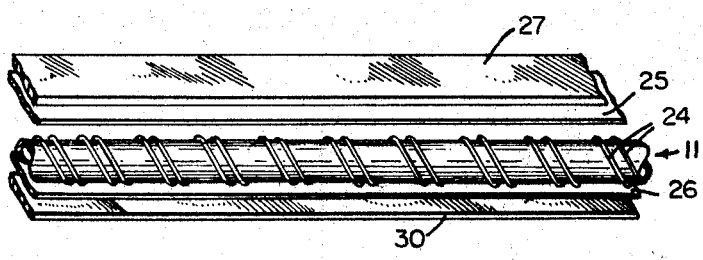
FIG.2
FIG.3
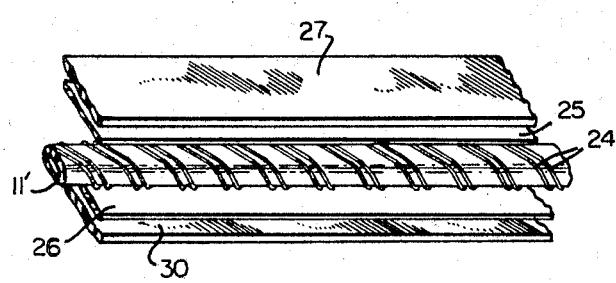
FIG.4
FIG.5
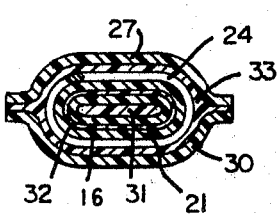
FIG.6
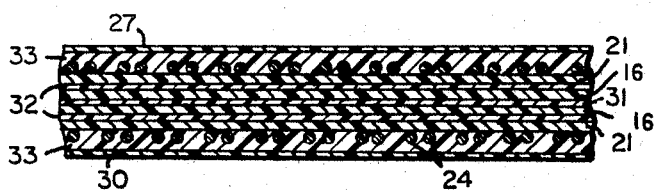
INVENTORS
WILLIAM D. GORDON
JOE A. WARBURTON
BY Richard E. Hosley
ATTORNEY

United States Patent Office 3,441,893
Patented Apr. 29, 1969

3,441,893
RESISTANCE TEMPERATURE DETECTOR
William D. Gordon, Lynn, and Joe A. Warburton, Melrose, Mass., assignors to General Electric Company, a corporation of New York
Filed Dec. 28, 1966, Ser. No. 605,469
Int. Cl. H01c 7/08, 3/00
U.S. Cl. 338—26            6 Claims

ABSTRACT OF THE DISCLOSURE

This disclosure sets forth a resistance temperature detector structure especially adapted for Class H motor operation. The resistance temperature detector is constructed of a temperature sensing element surrounded by insulating barriers of a polyimide film and a compatible fluorocarbon resin.

Background of the invention

This invention relates to temperature measuring devices and more particularly to resistance temperature detectors.

In recent years electric motor manufacturers have increased motor ratings while maintaining or decreasing the physical size of such machines with the advent of better insulating materials. Operation at these increased ratings subjects the motor to increased operating temperatures which can approach the temperature limits of even the improved insulation materials. Therefore, means have been incorporated in some motors to sense the winding temperatures to thereby protect the motor from thermal overload.

Generally, these measurements have been made by resistance temperature detectors constructed of a coil sandwiched between layers of a polyester, an epoxy or a silicone glass. The various layers constituting the sandwich have then been bonded together. However, such resistance temperature detectors required large quantities of insulation to withstand high voltage stresses applied in use and were quite thick. In addition, most of these detectors used a low viscosity liquid in the manufacture of the detectors which presented many manufacturing problems.

It is an object of this invention to provide a resistance temperature detector which is extremely thin and which has high temperature and dielectric characteristics.

Summary

Briefly, a resistance temperature detector constructed in accordance with the invention includes a temperature sensing element characterized by having a resistance which varies with temperature mounted on a core comprising layers of a polyimide film and a compatible fluorocarbon resin. This sensing element is then sandwiched between inner layers of the fluorocarbon resin and outer layers of the polyimide film.

The invention is pointed out with particularity and distinctness in the appended claims. The aforementioned and further objects, advantages and features of this invention can be more fully appreciated by reference to the detailed discussion of the construction of such a resistance temperature detector taken in conjunction with the accompanying drawings.

Brief description of the drawings

FIGURE 1 is a perspective view of a resistance temperature detector constructed in accordance with this invention;

FIGURE 2 illustrates the structure of a preferred sensing element which is adaptable for use in the resistance temperature detector of FIGURE 1;

FIGURE 3 shows the arrangement of all the elements as they would be used in one manufacturing technique;

FIGURE 4 presents the arrangement of all the elements as they would be in an alternative manufacturing technique; and FIGURES 5 and 6 provide cross-sectional views along the lines 5—5 and 6—6, respectively, of the finished resistance temperature detector shown in FIGURE 1.

Description of the preferred embodiments

The resistance temperature detector 10 illustrated in FIGURE 1 is formed of a temperature sensing element 11 disposed in an insulating member 12. Connections to the temperature sensing element 11 are provided by leads 13 and 14 which are adapted to be connected to a utilization means 15 for indicating temperature in the vicinity of the detector 10. In applications using a bridge circuit, three wires would be connected to the sensing element; two of the wires would be connected together. For example, if the resistance temperature detector 10 were embedded in the windings of a large motor, the utilization means 15 could be constituted by an alarm which would indicate when the motor winding temperature had exceeded acceptable temperature limits.

FIGURE 2 illustrates the construction of one form of a sensing element 11 adaptable for use in a resistance temperature detector. As shown in this figure, the sensing element 11 comprises a plurality of layers of material in concentric cylindrical form. Initially, a tube of an insulating material is formed. Such a tube, in a preferred embodiment, is constructed from two concentric layers of a polyimide film having a fluorocarbon resin film coating on the opposite sides thereof. For example, an inner composite film is constituted by a polyimide film 16 which results from the polycondensation reaction between an aromatic tetrabasic acid anhydride and an aromatic diamine. Specific details of the materials and the method of making polyimides may be obtained by referring to Dunnavant, "Progress in the Development of Heat-Resistant Organic Polymers," Plastics Design and Processing, April 1966 at page 14 et seq or to U.S. Patent 3,179,634 issued Apr. 20, 1965 and assigned to E. I. DuPont de Nemours and Company. One specific example of a polyimide film specifically adapted for use in the invention is pyromelletic dianhydride 4,4'-diamino-diphenyl ether described in the above-mentioned patent. This material may also be described as pyromelletic dianhydride p-p' oxydianiline or as poly [N,N'-(p-p'-oxydiphenylene) pyromellitimide] (see Milek, Polyimide Plastics: A State-of-the-Art Report, Hughes Aircraft Company, Oct. 1, 1965, p. 48). Each of these chemical designations refer to polyimides having the same chemical structure. This polyimide film 16 has first and second films of fluorocarbon resin 17 and 20 formed on opposite sides of the polyimide film 16. The fluorocarbon resin must be compatible with the polyimide film; one such fluorocarbon resin is Teflon-FEP which is a true thermoplastic manufactured and sold by E. I. DuPont de Nemours and Company. This composite film is then helically wrapped along a mandrel to form a cylinder. Then an identical composite film comprising a polyimide film 21 and fluorocarbon resin films 22 and 23 is wrapped in an offset helix around the inner composite film. After the two helixes are wrapped, the tube is heated until the fluorocarbon resin film melts, this compound being a thermoplastic, and the fluorocarbon resin films 20 and 22 adhere together. As a result of this construction technique, a cylindrical insulating tube is produced which is similar to a rigid soda straw.

The tube is then wound with a coil 24 by wrapping a pair of wires in a bifilar winding along the length of the tube. As bifilar winding is known in the art, it is not shown in detail in FIGURE 2. After the coil is wound, another fluorocarbon resin film can be overwrapped. Then the coil and tube are heated so that the outer fluorocarbon resin film and the film 23 enter the thermoplastic state and cement the coil 24 to the tube. This then provides a relatively rigid sensing element. The leads 13 and 14 are affixed to the pair of wires extending at one end of the tube while the wires ending at the other end of the tube are joined together. This produces a sensing element which has a relatively short physical length but a relatively long electrical length. In addition, wrapping the wires in a bifilar manner produces two coils wound in series opposition. Therefore, any changes in the current which would otherwise cause inductive errors are cancelled because the inductive effects produced by each coil section are equal and opposite; therefore, they cancel.

There are two approaches which can be taken to manufacture the final resistance temperature detector. The preferred form is shown in FIGURE 3, and it is accomplished by taking the sensing element 11 and disposing it in the center of a laminated assembly comprising intermediate laminates formed of the fluorocarbon resin film designated by numerals 25 and 26 and outer laminating layers 27 and 30 which are composed of the polyimide film. Another approach which can be utilized with the structure shown in FIGURE 3 is to substitute a composite film having a center polyimide film with inner and/or outer layers of the fluorocarbon resin film. The inner fluorocarbon resin film bonds to the intermediate fluorocarbon resin films 25 or 26. This entire assembly is then placed in a heat press and subjected to temperatures and pressures which are sufficient to melt the fluorocarbon resin, and the entire assembly is then forced together so that the sensing element 11 is completely collapsed. The result is the resistance temperature detector 10 shown in FIGURE 1.

To illustrate the size and characteristics of such a resistance temperature detector, reference is made to the following example made in accordance with this invention. The sensing element 11 was formed of a tube having an outside diameter of 90 mils wound with a Class H insulated magnet wire having approximately 5 mils diameter. The sensing element 11 was then sandwiched between Teflon-FEP layers 25 and 26, each having a thickness of 10 mils and outer layers of Kapton film 27 and 30, each having a thickness of 3 mils. After the pressing operation and a subsequent trimming operation, the resistance temperature detector had a thickness of 30 mils and a width of 260 mils. Although normal requirements for such a device require a 3 kilovolt high potential test for one minute, the resistance detector 10 has successfully passed high potential tests having potentials of 9 kilovolts. Such a detector made in accordance with this invention has exhibited excellent abrasion and cut-through resistance characteristics and has been successfully tested in Class H continuous operation.

FIGURE 4 illustrates another method of forming the resistance temperature detector shown in both FIGURES 5 and 6. In this arrangement, after the sensing element 11 is heated initially with the coil 24, the sensing element 11 is placed in a press and compressed until the flattened sensing element 11' results. The sensing element 11' is sandwiched between fluorocarbon resin layers 25 and 26 and polyimide film layers 27 and 30 and then pressed.

The detail of the final assembly resistance temperature detector is shown in FIGURES 5 and 6. Therein can be seen the central core 31 of the fluorocarbon resin and then concentric layers of the polyimide film 16, a fluorocarbon resin layer 32 formed by layers 20 and 22, and another layer of polyimide film 21. The outer layer of fluorocarbon resin film 33 cements the coil 24 to the central core and has also fused with the fluorocarbon resin film 25 or 26. The outer polyimide films 27 and 30 may also include a fluorocarbon resin on the outer layers of the polyimide film to facilitate removal from the heat press and mold.

In summary, a resistance temperature detector formed in accordance with this invention has a temperature sensitive resistance wire disposed between alternate layers of a polyimide film and a fluorocarbon resin. The resulting structure is extremely thin and exhibits high dielectric stress and high temperature capabilities. While many modifications of the resistance temperature detector are possible by utilizing different numbers of layers of polyimide film and fluorocarbon resins, these modifications are considered to be within the spirit and scope of this invention. Therefore, the appended claims are designed to cover all such embodiments which do fall within the true spirit and scope of the invention.

What is claimed as new and desired to be secured by Letters Patent of the United States is:

1. A resistance temperature detector comprising
  (a) a multilayer core formed from alternate layers of a polyimide film and a fluorocarbon resin compatible with said polyimide film, said polyimide film resulting from a polycondensation reaction between an aromatic tetrabasic acid anhydride and an aromatic diamine,
  (b) an insulated wire wound about said core, the resistance of said wire being sensitive to temperature change,
  (c) means connected to said insulated wire for connecting said wire to a utilization means adapted to measure resistance variations in said wire, and
  (d) outer insulating barriers formed from a layer of said fluorocarbon resin contiguous to said wire and an outer layer of said polyimide film.

2. A resistance temperature detector as recited in claim 1 wherein said core has first and second layers of said polyimide film and an intermediate layer of said fluorocarbon resin.

3. A resistance temperature detector as recited in claim 2 wherein said multilayer core additionally has layers of said fluorocarbon resin on the outer surfaces of said polyimide layers.

4. A resistance temperature detector as recited in claim 1 wherein said coil is constituted by a pair of insulated wires wrapped in a bifilar manner and connected in series opposition, said connecting means being connected to the ends of the wire at one end of said coil.

5. A resistance temperature detector as recited in claim 1 where in said outer insulating barriers are formed of first and second layers of said fluorocarbon resin film on opposite sides of said coil and said first and second outer layers of said polyimide film.

6. A resistance temperature detector as recited in claim 5 additionally comprising an outer film of said fluorocarbon resin.

References Cited

UNITED STATES PATENTS

| | | | |
|---|---|---|---|
| 2,717,945 | 9/1955 | Dresios et al. | 338—26 |
| 2,745,944 | 5/1956 | Price | 338—26 X |
| 2,863,035 | 12/1958 | Vinson et al. | 338—26 |
| 3,217,083 | 4/1965 | Gore | 252—66 X |

REUBEN EPSTEIN, *Primary Examiner.*

U.S. Cl. X.R.

338—25, 212, 214; 252—63.7, 66